UNITED STATES PATENT OFFICE.

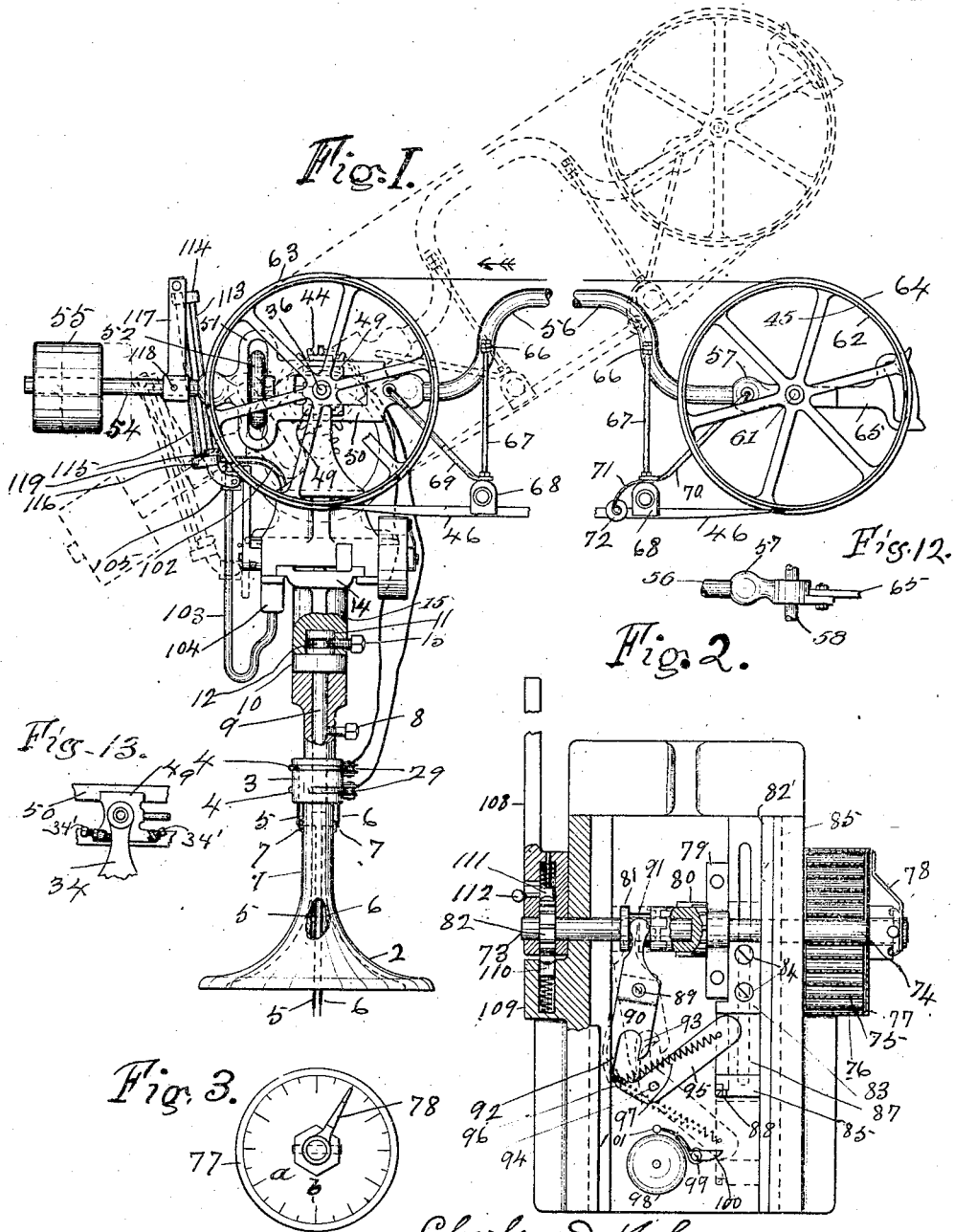

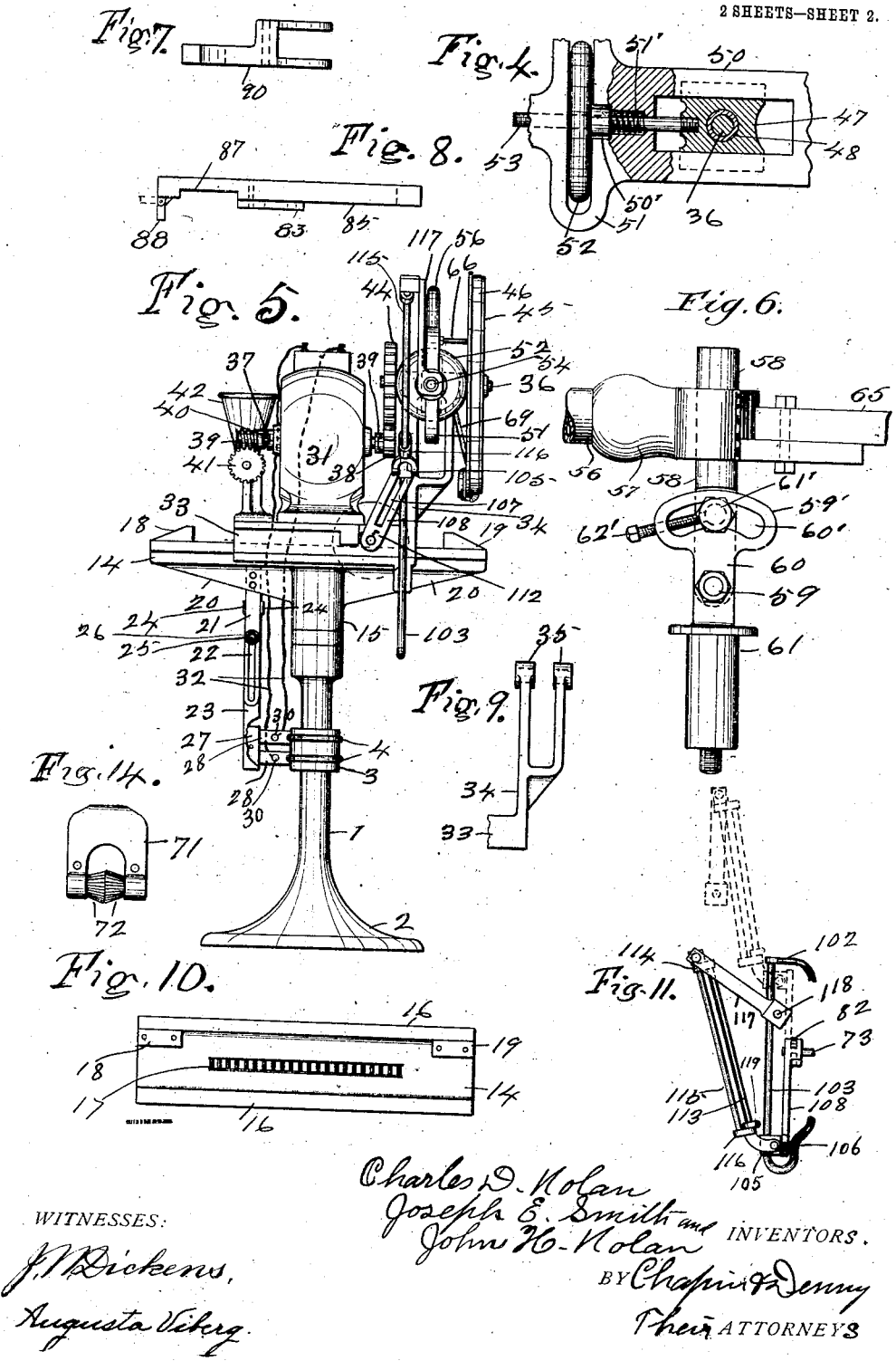

CHARLES D. NOLAN, JOSEPH E. SMITH, AND JOHN H. NOLAN, OF FORT WAYNE, INDIANA.

MEAT AND BONE CUTTING MACHINE.

950,638.  Specification of Letters Patent.  Patented Mar. 1, 1910.

Application filed August 31, 1908. Serial No. 450,981.

*To all whom it may concern:*

Be it known that we, CHARLES D. NOLAN, JOSEPH E. SMITH, and JOHN H. NOLAN, citizens of the United States, residing at Fort Wayne, in the county of Allen, in the State of Indiana, have invented certain new and useful Improvements in Meat and Bone Cutting Machines; and we do hereby declare that the following is a full, clear, and exact description of the invention, which will enable others skilled in the art to which it appertains to make and use the same, reference being had to the accompanying drawings, which form part of this specification.

Our invention relates to meat and bone cutting machines.

The primary object of our invention is to provide a comparatively cheap, efficient and convenient meat and bone cutting machine adapted to employ an electrically operated band-saw in coöperative relation with hand actuated mechanism for advancing the saw laterally the desired thickness of a cut, under an automatic regulation thereof.

Our invention consists of an upright hollow supporting pedestal surmounted by a pivoted table like frame having longitudinal ways and an interposed longitudinal rack; a gear-carriage movably mounted on the ways and carrying the entire operating mechanism; a power shaft mounted on the carriage and geared to a suitable motor on the carriage; means for actuating the carriage on the ways; means for automatically returning the carriage to its starting point when it reaches the limit of its travel; a band-saw adjustably mounted on the carriage in right-angular relation therewith; means for maintaining the saw in the operative portion of its travel in a vertical position without materially straining the same; means for removing the bone dust from the saw during its operation.

The principal novel features of our invention reside in the construction and operation of the reciprocating carriage, and the means for actuating the same from the opposite limits of its travel; the means for automatically measuring and indicating the thickness of each cut; and the manner of connecting the motor to the power circuit whereby the conducting wires are out of the way and out of sight in use.

Similar reference numerals indicate like parts in the several views of the drawings in which—

Figure 1 is a view in elevation of our invention, partly broken away, and partly in section and showing in dotted outline the position of the band-saw and its supporting means when not in use. Fig. 2 is a bottom plan of the reciprocating carriage partly in section to show the construction of the two-part shaft, and the ratchet mechanism therefor, and also showing in central section the helical spring for actuating the carriage in its return movement. Fig. 3 is a detail of the dial plate and the indicator finger in position thereon. Fig. 4 is a view of the means for longitudinally adjusting the saw-carrying frame to tighten up or relax the tension of the saw. Fig. 5 is a side view of the invention taken at right-angles to Fig. 1, looking from the left, with the counterbalancing weight of the saw frame removed, and showing the manner of connecting the invention with a proper meat grinder. Fig. 6 is a detail of the shaft for the rear wheel of the saw-frame. Figs. 7 and 8 are details of two of the movable parts of the carriage mechanism. Fig. 9 is a fragmentary detail of the carriage bracket which supports the saw frame and the saw actuating mechanism. Fig. 10 is a plan of the carriage supporting table showing the relative arrangement of the ways, limiting stops and the centrally arranged rack-bar. Fig. 11 is a side elevation of the means for regulating the travel of the carriage, the uppermost limit of its movement being shown in dotted outline. Fig. 12 is a fragmentary detail plan view of the boxing 57 showing its connections with the stub-shaft 58. Fig. 13 is a fragmentary detail of the cross-head and cross-head block, showing the set screws for securing these parts in a fixed relation. Fig. 14 is a detail of the hanger-bracket and brushes for cleaning the saw. Fig. 15 is a fragmentary detail side view of the lug 109 in vertical section showing the arrangement of the pawls 110 therein, and showing their relation to the ratchet wheel 82, and the pawl 111 of the arm 108.

All parts of our invention are preferably made of suitable metal except the insulating parts.

The pedestal 1 of proper proportions is hollow and has a flaring bell shaped base 2, and is provided with a concentric block 3 of wood or other insulating material near whose upper and lower edge are arranged a pair of semi-cylindrical bands 4 to which are electrically connected the upper and adjacent ends of the wires 5 and 6 respectively. These wires 5 and 6 then enter the pedestal through opposite openings, having proper insulating bushings 7 therein, and then pass downward through the hollow interior of the pedestal, and through the floor upon which it rests, not shown, to the power circuit.

In the hollow upper portion of the pedestal is rigidly fixed, by means of the set-screw 8, or other proper manner, a pin 9 having a circular head 10 of the same cross-section as that of the upper end of the pedestal upon which it rests, Fig. 1. This head 10 has a reduced cylindrical extension 11 provided with an annular recess 12 adapted to loosely receive the inner end of the screw 13. On the pin 9 is rotatively mounted the table 14 having a pendent cylindrical centrally arranged extension 15 having a circular opening in its lower end to receive the said extension 11, and has a lateral opening for the screw 13 by means of which the table is pivotally secured in position upon the pin 9, and is vertically adjustable, and can be firmly secured in any desired vertical adjustment by the screw 8. The table 14 has its opposite sides provided with the slightly elevated parallel tracks or ways 16, Fig. 10, for the carriage hereafter described. Intermediate of the ways 16 on the said table is arranged the fixed or integral rack 17, and at one side and at opposite ends thereof respectively are fixed the stop blocks 18 and 19 adapted to limit the travel of the carriage in both directions and to aid in actuating the clutch mechanism hereafter described.

To one of the strengthening webs 20 of the table 14 is rigidly secured the pendent arm 21 having a slot 22 in its lower end. From this arm is adjustably suspended the hanger-arm 23 provided upon its upper end with the lateral guides 24, and having a fixed bolt 25 adapted to pass loosely through the slot 22 and having upon its outer end a suitable nut 26 for firmly securing the two arms together. The lower end of the hanger arm 23 is provided upon one side thereof with a proper insulating block 27 of wood or other suitable material rigidly fixed thereto. To the outer face of this block are rigidly secured one end of the short trolley arms 28 carrying upon their free ends the respective trolley wheels 29 so arranged as to be firmly maintained upon the said tracks 4 in use. The trolley arms are provided between their ends with proper binding posts 30 which are connected to the electric motor 31 by means of the insulated wires 32. On the table 14 is movably mounted the carriage 33 having upon the forward end thereof the upright bracket 34 provided with the oppositely arranged bearings 35 Fig. 9, in which the driven shaft 36 for the saw actuating mechanism is rotatively mounted. On the carriage near its rear end is arranged the said electric motor whose power shaft 37 carries upon its forward end a pinion 38, and a keyed clutch 39 adapted to engage the pinion 38. The rear end of the shaft 37 has a loosely mounted worm 39, and an adjacent keyed clutch 40 adapted to be engaged therewith. The worm 39 is adapted for an actuating engagement with the gear wheel 41 fixed on the adjacent end of the driven shaft carrying proper meat cutting or grinding knives, not shown, for the meat grinder 42 of any proper construction. The meat grinder itself, of course, is no part of our invention and can be omitted at pleasure. The power shaft 37 is thrown into or out of an actuating engagement with the meat grinder by means of the splined clutch 40 in a well understood manner.

On the inner end of the driven shaft 36 is fixed a gear wheel 44, Fig. 5, in mesh with a driving pinion 38. On the outer end of the shaft 36 is fixed a comparatively large wheel 45, on which is mounted one end of the band saw 46. Substantially midway of the ends of the shaft 36 is arranged a cross-head block 47, Figs. 1 and 4 and an interposed bearing sleeve 48. This cross-head has upon both its upper and its lower faces opposite lateral longitudinal flanges 49 between which is slidably mounted the cross-head 50. This cross-head has a vertically arranged integral yoke 51 in which is arranged a hand-wheel 52. The wheel 52 is internally screw-threaded and mounted on the screw-threaded spindle 53 having one end loosely mounted in the cross-head, and having its other end fixed in the cross-head block 47, whereby the cross-head is adjustable in either direction on the block 47, by the rotation of the hand-wheel 52 in a well understood manner. On the screw-spindle 53 adjacent to one side of the wheel 52 is arranged a loose collar 50'. In a suitable recess in the cross-head 50 and about the shaft 53 is arranged a coil spring 51', having one end bearing against the inner end of the recess, and the other end bearing against the adjacent end of the collar 50'. The function of the spring 51' is to compensate for the contraction and expansion of the saw under varying temperatures to avoid breaking the same, as follows: When the saw is expanded under an abnormal temperature the spring 51' correspondingly expands and acts on the cross-head 50 forcing it outward and thus takes up the expansion of the saw.

To the forward end of the cross head 50 is rigidly secured, preferably by a screw-threaded connection the forwardly extended rod 54 on which is adjustably mounted the counter balancing weight 55. To the other end of the cross head is similarly secured the rearwardly extended rod 56 whose rear end is similarly secured to the forward end of the boxing 57, Figs. 1 and 12. This boxing has a journal bearing for the stub-shaft 58 whose inner end is flattened and provided with a fixed pin 59 which passes through the inner and adjacent flattened portion 60 of the stub-shaft 61 on which the rear wheel 62 is rotatively mounted. On this wheel 62 the rear portion of the saw 46 is mounted. The flat portion 60 has its free end provided with a loop 59' having a curved lateral slot 60' therein through which projects a screw 61'. The forward end of the loop 59' has, a screw-threaded perforation in which is mounted the screw 62' whose inner end bears against the adjacent side of the screw 61', and is adapted for laterally adjusting the shaft 61.

The wheels 45 and 62 are each provided upon the inner edge of their perimeters with the annular flanges 63 and 64 respectively, against which the back edge of the saw bears in use. To the rear end of the boxing 57 is rigidly fixed a handle 65 adapted to enable the operator to raise and lower the saw with its supporting bracket frame on its pivoted bearing on the shaft 36 at pleasure.

The rod 56 which is a part of the saw supporting frame is upwardly curved at its central portion to admit a greater thickness of meat beneath the same during the operation of cutting, as shown in Fig. 1. At proper points on the outer face of the bracket frame 56 are rigidly fixed the lateral short brackets 66 in whose vertically apertured free ends are rigidly secured the upper ends of the pendent hanger rods 67 respectively, to whose lower ends are rigidly fixed the vertically slitted saw-guides 68 respectively. The hanger rods 67 are given greater rigidity in use by means of the inclined brace rods 69 and 70, the former of which has its upper end fixed in the outer face of the cross-head 50, and its lower apertured end rigidly secured to the lower end of the forward rod 67; and the latter of which has its upper end secured in the outer face of the boxing 57 and its lower apertured end fixed to the lower end of the rear rod 67. By the employment of our improved pendent saw-guides thus described, the portion of the saw between the guides, and which is the only portion which operates upon the meat, is maintained in a vertical and operative position without the necessity of giving the saw a twist in mounting it upon the carrying wheels.

Directly in front of the rear rod 67 and detachably connected thereto is arranged a bifurcated hanger-bracket 71 carrying the oppositely arranged brushes 72, Figs. 1 and 14, whose inner ends bear upon the opposite sides of the saw 46, and thereby remove all bone dust therefrom in use, assuming, of course, that the saw travels in the direction of the arrow in Fig. 1. In the lower edge of the cross-head block 47 and upon one side thereof are arranged a pair of adjustable set-screws 34' one upon each side of the bracket 34, Fig. 13 whose function is to limit the upward and downward stroke respectively of the saw bracket by the contact of their inner ends with the bracket 34.

The portions of the saw about the carrying wheels should, of course, be provided with a suitable shield to prevent injury to the operator or others by contact therewith. As such devices are a common mechanical expedient they have not been shown.

The carriage actuating mechanism is described as follows: In suitable bearings in the sides of the carriage 33 near the forward end thereof is revolubly mounted a two-part shaft formed of the two alined horizontal sections 73 and 74, Fig. 2. The shaft section 74 has one end outwardly extended and provided with a helical spring 75 having one end fixed thereto and having its other end fixed to the inclosing casing 76 whose front face 77, Fig. 3, forms an indicating dial to measure the advance of the carriage and of the saw 46 to determine the desired thickness of meat to be cut, in the manner hereafter described. The spring 75 is wound up to increase its tension by the advance of the carriage, and is adapted by its tension to automatically return the carriage to its starting point under the conditions hereafter described. The shaft section 74 has its outer end provided with a fixed finger 78 adapted to turn therewith and thereby give the reading of the dial 77. The inner end of this shaft section 74 is loosely mounted in a suitable bearing 79 which is secured to the lower face of the carriage. The inner end of the shaft section 74 is provided with a fixed gear wheel 80 having a clutch face on its outer face, and is provided with a central lateral opening adapted to loosely receive and form a bearing for the inner end of the shaft section 73, the other end of which has a bearing in the adjacent side of the carriage frame. The wheel 80 forms a meshing engagement with the rack 17 on the table 14. On the shaft section 73 is keyed and slidably mounted a clutch 81 adapted to form a holding engagement with the adjacent face of the wheel 80, and on the outer extended end of the shaft section 73 is fixed a small ratchet wheel 82.

The means for automatically throwing the clutch 81 into and out of engagement with the gear wheel 80 is as follows: Between the bearing block 79 and the adjacent edge of the longitudinal ledge 82' of the lower face of the table is rigidly fixed the plate 83, secured in position by the longitudinally alined screws 84. Directly above the plate 83 is slidably mounted the plate 85 having a longitudinal slot 86 in its forward end through which loosely pass the screws 84. The rear end of the plate has a recess 87 in its lower face, and has its adjacent extremity provided with a pivoted pendent pawl 88, Figs. 2 and 8 to aid in actuating an alarm bell when the carriage has nearly reached the forward limit of its travel.

On a fulcrum pivot 89 in the carriage is pivotally mounted the lever 90, Figs. 2 and 7, whose bifurcated forward end is adapted to loosely engage the annular recess 91 of the clutch 81. The rear end of this lever 90 has an extended finger 92 upon its outer edge and spaced therefrom it has a shorter finger 93 upon its inner edge. At a suitable point to the rear of the lever 90 is fixed a pivot 94 on which is pivotally fulcrumed the lever 95 having a curved laterally arranged finger 96 upon one end adapted to remain at all times between the said fingers of the lever 90 and engage first one and then the other of such fingers in the operation of the clutch 81. The other end of the lever 95 is arranged in the recess 87 of the plate 85 which is adapted to actuate the clutch 81 through the medium of the levers 90 and 95 in the manner hereafter described.

At a suitable point on the lower face of the carriage is fixed one end of a coiled spring 97 whose other end is fixed to the end of the lever 95 which is arranged in the recess 87.

An alarm bell 98 is fixed to the lower face of the carriage near its rear end. On an adjacent pivot 99 is pivotally mounted a short finger 100 which projects into the path of the pendent pawl 88 and to engage the same. On the pivot 99 is also mounted the spring-pressed striker 101 in such relation to the finger 100 that the engagement of the pawl 88 with the finger 100 will withdraw the striker away from the bell and when the pawl 88 passes by the end of the finger 100, the striker 101 will return to its normal position under the tension of its actuating spring and will ring the bell.

The means for regulating the movements of the carriage are as follows: A short forwardly projecting arm 102, Figs. 1 and 11, is fixed at one end to the base of the bracket 34. To the other end of this arm is fixed one end of the guide rod 103 whose other end is preferably curved as shown in Fig. 1 and then fixed to a pendent lug 104 on the lower face of the carriage at one corner of its forward end. On the guide-rod 103 is slidably mounted a vertically apertured block 105 having upon its inner face a cylindrical lateral lug 106 adapted for a sliding movement in the slot 107 of the ratchet arm 108. This arm 108 has one end bifurcated and adapted to embrace the gear wheel 82, and is loosely mounted on the outer end of the shaft section 73, Figs. 2, 5 and 11. In a suitable housing lug 109 on one side of the carriage is arranged a pair of vertically spring-pressed pawls 110 adapted to so engage the gear wheel 82 as to prevent any return movement thereof in use, and to present no interference with the forward movement of wheel 82. When one pawl 110 is in a locked engagement with a tooth, the other pawl 110 rests loosely on the face of a tooth, whereby any jumping movement backward of the carriage is prevented. In a suitable recess in the base of the arm 108 is arranged a spring-pressed pawl 111 adapted to normally form a locked engagement with the wheel 82 to enable the arm 108 to actuate the shaft section 73 through the medium of the wheel 82. The pawl 111 has a laterally projecting handle 112 by means of which the operator can withdraw the pawl 111 from its engagement and secure it in such position. A rod 113 has its bifurcated lower end pivotally connected to the sliding block 105, and has its upper end provided with an apertured guiding lug 114, Figs. 1 and 11, in which the upper end of a parallel rod 115 is slidably mounted. The rod 115 has upon its lower end a vertically apertured lug 116 which is slidably mounted on the rod 113, and has upon its upper end a fixed block 115′, Fig. 5. This block 115′ is pivotally connected to the upper end of the arm 117, whose lower end is fixed to the rod 54 by a set-screw 118. On the guide rod 113 is slidably mounted an adjustable split clamp 119, which can be rigidly fixed in any desired position thereon in a well understood manner for the purpose hereafter described.

The operation and manner of employing our invention thus described is obvious, and briefly stated is as follows: The operator, having first supplied current to the motor 31 through the wires 5 and 6, which thereby actuates the saw 46 through the medium of the pinion 38, the gear wheel 44, the shaft 36 and the wheels 45 and 62, in the direction of the arrow in Fig. 1, sets the spring-pressed pawl 111 in its engagement with the wheel 82. Assuming that a piece of meat to be cut or sliced is placed upon a suitable support, not shown, directly beneath that portion of the saw which is located between the hanger-rods 67, he so sets the clamp 119 on the rod 113 as to limit the forward movement of the carriage at each operation of the saw to a distance exactly equal to the desired thickness of each slice of meat to be cut. If the operator desires the full travel of the carriage he sets the clamp 119 at its lowest limit on the rod 113, as follows: When he elevates the saw to its upper limit the mechanism shown in Fig. 11 assumes the relative positions shown in full lines, and when he lowers the saw to its lowest limit the parts assume the position shown in dotted lines since the arm 117 is actuated by rod 54 thereby forcing rods 113 and 115 downward together and thereby forcing arm 108 downward by the engagement of the lug 106 of the block 105 with the slot 107 of arm 108. If the clamp 119 is set at its upper limit the carriage can not be moved, the saw can however be moved as before. If the clamp 119 be set midway of its limits on the rod 113, the feed of the carriage will be just one-half as much as when the clamp is set at its lowest limit. It is evident that when the clamp 119 is set half way up the rod 113 and the saw is lowered from its elevated position, lug 116 will travel up rod 113 until it reaches clamp 119. After touching it and continuing the upward motion, rod 113 will also move upward causing arm 108 to rise, the pawls allowing this motion without change in the position of the carriage. When the saw is lifted, lug 116 moves away from clamp 119 down rod 113 until it reaches the shoulder at the bottom, whereupon the rod 113 begins to move down carrying arm 108, this causing the carriage to move. The operator then seizes the handle 65 and brings the electrically actuated saw 46 into operative contact with the meat, after which the saw makes a clean cut through both bone and meat, the bone dust being promptly removed from the saw by the brushes 72 at each passage of the saw through the meat. He now elevates the saw with its carrying frame on the shaft 36 as a pivot, into the position shown in dotted outline in Fig. 1. This upward movement of the saw-frame rotates the shaft forwardly through the downward movement of the ratchet arm 108 and its ratchet connection therewith, thereby correspondingly moving the carriage 33 forward through the engagement of the gear wheel 80 with the fixed rack 17 on the table 14. This carries the carriage with the surmounted saw forward into position for cutting another slice after which the operator brings the saw and its carrying frame down into the operative position shown in full lines in Fig. 1, and cuts another slice as before. In like manner he advances the saw and its carriage step by step to the limit of its forward travel, after which it is automatically returned to its starting point as follows: When the carriage nearly reaches the forward limit of its travel the stop 19 engages the forward end of the movable plate 85 and slides it forward carrying with it the engaged end of the pivoted lever 95 until the spring 97 connected thereto is moved to the other side of the fulcrum pivot 94 under an increase of its tension.

The forward movement of the plate 85 causes the pendent finger 88 to engage the pivoted finger 100 and thereby brings the striker 101 away from the bell against the tension of its spring until pawl 88 passes by finger 100, thereby releasing striker 101 which automatically comes into striking contact with the alarm bell 98, thus notifying the operator the carriage has nearly reached its forward limit and that the clutch 81 is about to be disengaged from the wheel 80 by means of the lever 90, after which the carriage will be returned to its starting point by the tension of the coil spring 75. This sudden forward movement of the lever 95 brings its curved other end into an actuating engagement with the short finger 93 of the lever 90 thereby forcing it into the position shown in dotted lines in Fig. 2, and thus disengaging the clutch 81 from its locked engagement with the wheel 80. This permits a free rotary movement of the shaft in a backward direction under the impulse of the helical spring 75, and thus returns the saw and its carriage to the starting point. The return movement of the said carriage causes the stop 18 on the supporting table to engage the rear end of the plate 85 and force it back to its normal position as shown in full lines in Fig. 2. This return of the plate 85 also forces the return of the levers 90 and 95 to a position in which the tension of the spring 97 on the other side of the pivot 94 will by a sudden movement throw the long end of the lever 95 to its limit against the forward end of the recess 87, and thereby actuating the pivoted lever 90 by engaging the long finger 92 thereof, and thereby forcing its return to normal position, carrying with it the clutch 81 into its locked engagement with the gear-wheel 80. As the finger 78 is fixed on the outer end of the shaft 74 it will rotate therewith and will indicate upon the dial 77 the space in inches and fractions thereof over which the carriage moves at each elevation of the saw frame, and thereby indicates the thickness of each slice of meat. The distance between the outer ends of the lines $a$ and $b$ indicates one-fourth of an inch.

To shorten the upward throw or movement of the saw frame, and consequently proportionally lessen the forward movement of the carriage at each operation thereof, the operator elevates the adjustable stop 119 on the guide-rod 113. The stop 119 for the greatest upward throw of the saw frame is secured at its lowest limit, as shown in Fig. 1. In this position the operator is enabled to cut the greatest thickness of slices.

As the rear wheel 62 has a forward rotation it has a constant tendency to turn the shaft 61 toward the left in Fig. 6, and thereby get the saw out of alinement. The shaft 61 can be trued up readily by means of the screw 62' in an obvious manner.

It is obvious that by the use of the trolley arms 28 trolley wheels 29, and the insulated tracks 4 the power wires can be arranged upon the hollow interior of the pedestal, and out of the way of the operator, and in such a manner that the table 14 with its surmounted carriage and saw can readily be swung around into any desired position.

When the machine is not in use the saw is swung up out of the way into the position shown in dotted outlines in Fig. 1.

Having thus described our invention and the manner of employing the same what we desire to secure by Letters Patent is:

1. In a meat and bone cutting machine, a supporting hollow pedestal; a table revolubly mounted on the pedestal and provided with a longitudinal way and an interposed rack; a carriage mounted on the said ways and provided at its forward end with an upright bracket; a transverse two-part shaft revolubly mounted in the carriage, having a fixed gear wheel upon the inner end of one shaft section in mesh with the said rack, the said wheel having a concentric recess adapted to loosely receive the adjacent end of the other shaft-section; a keyed clutch slidably mounted on the last named shaft section and adapted to engage the adjacent face of the gear-wheel; means on the carriage for throwing the clutch into and out of its engagement; an electric motor on the carriage; a horizontal shaft revolubly mounted in the said bracket; means for connecting the last named shaft with the motor; a band-wheel fixed on the outer end of the last mentioned shaft; a saw frame pivoted on the last named shaft; a second band wheel mounted on the rear end of said frame; a band saw trained upon the said band wheels; and an actuating connection between the carriage shaft and the saw frame.

2. In a meat cutting machine a supporting pedestal; a rotary table on the pedestal having saw-carriage ways thereon, and provided with a fixed horizontal rack; a saw-carriage on the said ways, and provided with an actuating connection with the said rack; an electric motor mounted on the carriage and provided with a power-shaft; a driven shaft revolubly mounted in the carriage and having a driving connection with the power shaft; a band-wheel fixed on the outer end of the driven shaft; a saw bracket pivotally fulcrumed on the driven shaft; a second band wheel mounted on the rear end of the said bracket in alinement with the first mentioned band wheel; a saw trained on the said band wheels; an actuating connection between the forward end of the said bracket and the saw carriage; and means for automatically returning the said carriage to its starting point when it has reached the limit of its forward movement.

3. In a meat cutting machine an upright pedestal; a pair of annular trolley tracks mounted on the pedestal and properly insulated therefrom; a table revolubly mounted on the pedestal; a pendent arm secured to said table; a pair of trolley arms carried by the said pendent arm and insulated therefrom, and provided with a pair of trolley wheels adapted to run on the said tracks; a horizontal rack fixed on the table; a saw carriage mounted on the table and provided at its forward end with an upright saw supporting bracket; an electric motor mounted on the table; means for electrically connecting the motor with the power circuit through the said insulated trolley arms and tracks; a sectional shaft loosely mounted in the carriage, one shaft section carrying upon its inner end a fixed ratchet wheel in mesh with the said rack and provided with a bearing of the adjacent end of the other cooperating shaft section; a slidable clutch on the second shaft section adapted to engage the said ratchet-wheel; means for automatically throwing the clutch into and out of its engagement at the respective limits of travel of the carriage; means for actuating the carriage by a series of measured advances; and means for automatically returning the carriage to its initial position.

4. In a machine of the class described a saw carriage movably mounted on a rotary support, and having an upright bifurcated bracket at its forward end, and provided with the following instrumentalities; a rotary table; a band saw operatively mounted on the carriage; a two-part transverse shaft loosely mounted in suitable bearings, one shaft section having upon its inner end a rigid gear wheel having a clutch face and a concentric bearing for the adjacent end of the second shaft section, the second section being provided at its outer end with a fixed actuating ratchet wheel; a clutch slidable on the second shaft section and adapted to engage the first named gear wheel; means for automatically throwing the said clutch into and out of its engagement; a fixed horizontal rack in mesh with the said rigid gear wheel; pawls normally in engagement with the said actuating gear wheel; and means for automatically measuring the successive advances of the carriage.

5. The combination of a supporting pedestal; a rotary table on the pedestal; a reciprocating saw carriage on the table having an upright bracket at its forward end; means for supporting the saw in a right angular relation to the carriage; means for so pivoting the saw supporting means as to adapt the same for a vertically swinging movement; a band saw trained upon its supporting means; means for actuating the saw; means for operatively connecting the carriage with the saw supporting means to impart to the carriage its forward movements for the successive advancements of the saw; means for limiting the swinging movements of the saw supporting means; means for measuring the advance of the carriage at each movement thereof; and means for automatically returning the carriage to its initial position, all substantially as described.

Signed by us at Fort Wayne, Allen county, State of Indiana, this 26th day of August, 1908.

CHARLES D. NOLAN.
JOSEPH E. SMITH.
JOHN H. NOLAN.

Witnesses:
AUGUSTA VIBERG,
WATTS P. DENNY.